…

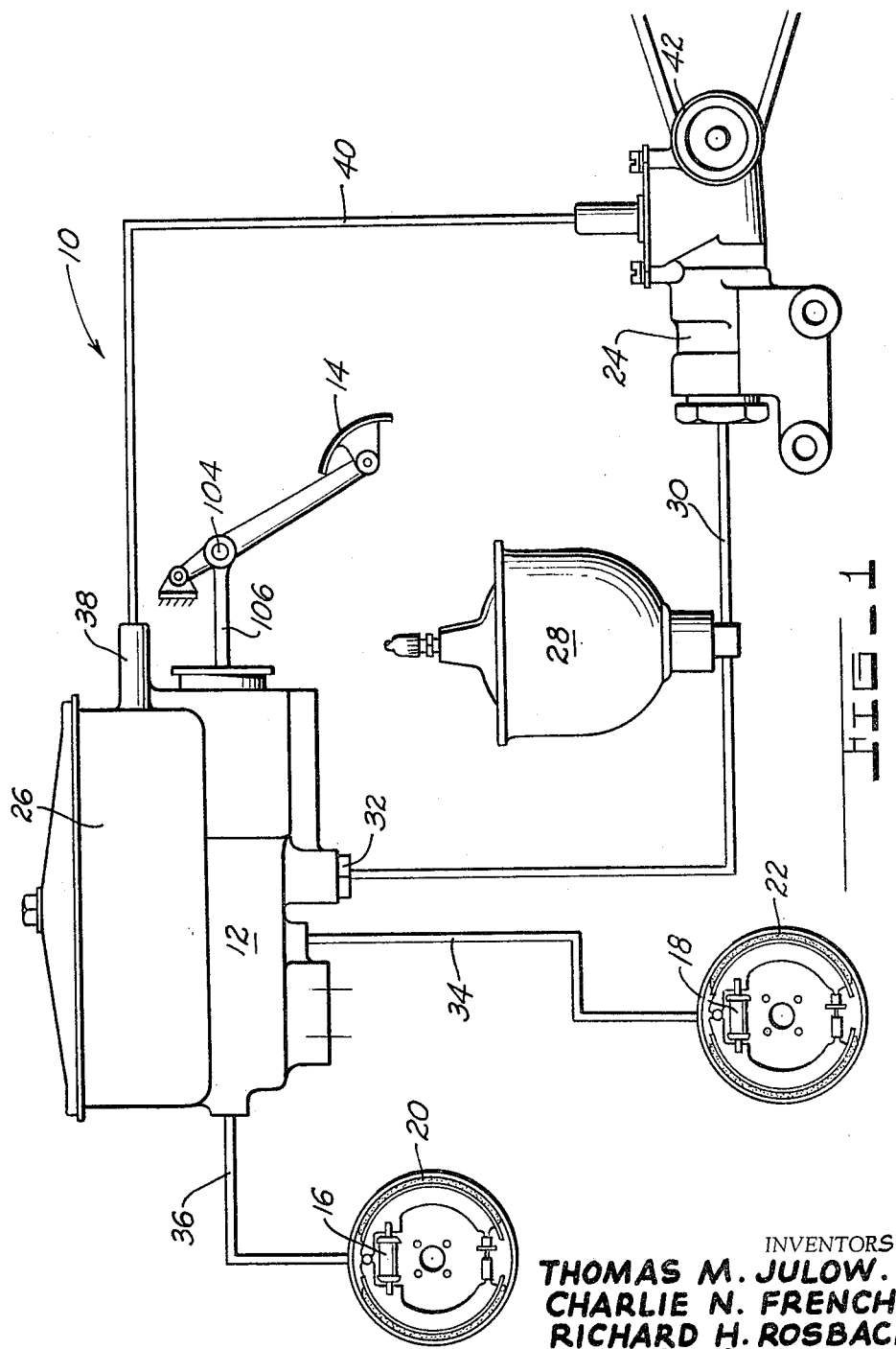

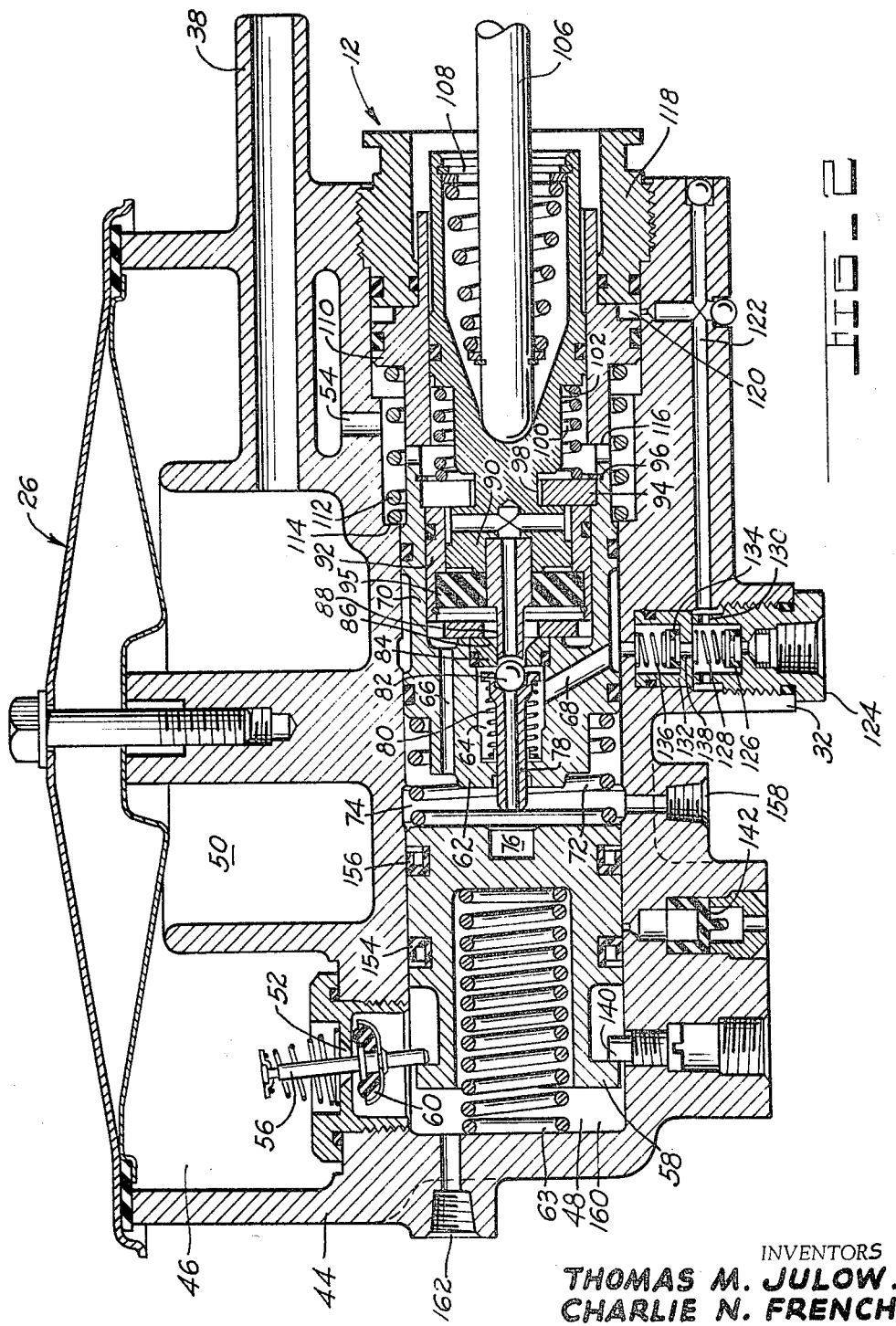

United States Patent Office 3,283,505
Patented Nov. 8, 1966

3,283,505
POWER BRAKE CONTROL MEANS
Thomas M. Julow, Charlie N. French, and Richard H. Rosback, South Bend, Ind., assignors to The Bendix Corporation, South Bend, Ind., a corporation of Delaware
Filed Sept. 15, 1964, Ser. No. 396,531
3 Claims. (Cl. 60—54.5)

This invention relates to a power brake system of the full hydraulic type. As the more modern cars became quite space conscious, the effective braking radius of a drum and/or disc brake is reduced. This has introduced a need for a brake actuator delivering high pressure with unlimited fluid displacement. As those skilled in the art to which our invention relates no doubt realize such a pressure displacement requirement as applied to present-day air and vacuum power units requires a growth in size of the power unit. This is not deemed advisable in view of the need for more passenger space and less equipment space of the modern day automobile.

Therefore, we are suggesting a hydraulic power unit to eliminate space problems and provide high output pressure with unlimited displacement, which power unit is simple to manufacture having fail-safe features adaptable to present-day braking systems.

It is another object of our invention to provide a hydraulic power control structure for a brake system of this type.

A further object is to provide a hydraulic power control valve having minimum travel required to operate it.

A still further object is to provide a hydraulic power brake control mechanism with means to increase pedal travel upon power failure to provide for no-power braking.

It is a yet further object to provide a power brake control valve adapted to provide follow-through manual braking in event of a power failure, in which case means are provided to trap a pressurized fluid within the power brake control valve to aid in manually applying the brakes.

A still further object of our invention is to provide a hydraulic power braking system for a vehicle with a power brake control mechanism which incorporates a spring-loaded accumulator to keep a reserve supply of power pressure to aid in the transition from power to manual application.

Other and further objects of our invention will appear from the following description of the drawings in which:

FIGURE 1 is a schematic view of a hydraulic power braking system incorporating a power braking control means in accordance with the principles of our invention; and FIGURE 2 is a cross sectional view of the power braking control means embodying our invention.

With particular reference to FIGURE 1, we show a hydraulic power system 10 including a master cylinder control valve assembly 12 operated by a brake pedal 14 to actuate, independently of each other, a pair of wheel cylinders 16 and 18 for a vehicle's rear and front brakes 20 and 22, respectively.

Furthermore, our power system includes a pump 24, a reservoir 26 and an accumulator 28. The pump may be a variable displacement type or a constant displacement type with a bypass provision depending upon the preference of the vehicle manufacturer. In any event, the pump delivers fluid pressure on the order of 1700 to 1800 p.s.i. to a conduit 30 leading to an inlet 32 in the master cylinder control valve assembly after supplying the accumulator. From the master cylinder control valve assembly the fluid pressure supplied thereto by pump 24, when scheduled by application of the brake pedal 14, will be delivered to conduit 34 to actuate the wheel cylinder 18 and at the same time will compress a fluid chamber to provide pressure fluid to a conduit 36 to similarly actuate wheel cylinder 16. Upon release of the brake pedal 14, means are provided to return excess fluid within the conduits 34 and 36 to reservoir 26 which by means of an outlet 38 supplies the pump 24 by way of conduit 40. In addition, the pump 24 is driven by means of a pulley 42 that is mounted to the vehicle engine such that it is driven by the fan belt thereof. Other drive means are no doubt available, such as driving off a cam shaft or a distributor shaft, but it is felt that one of the simplest means of deriving power for the pump 24 is to utilize the fan belt of a vehicle engine.

Referring now to FIGURE 2, the master cylinder control valve assembly is shown to be preferably constructed from a solid housing 44 provided with a reservoir cavity 46 and a power chamber cavity 48. The reservoir cavity 46 is provided with a central well 50 in order to insure adequate supply of fluid to the discharge port 38 regardless of the inclination of the master cylinder control valve assembly; and the cavities 46 and 48 are communicated by means of a valved opening 52 and a passage 54 at opposite ends of the housing 44. The valved opening is provided with the means of a treadle 56 having a depending portion that operatively engages a radial flange of a piston 58 to remove the rubber seat 60 from the surface underlying the opening, thereby permitting communication of the reservoir cavity 46 and the power cavity 48 surrounding the piston 58 when the piston is in its rearwardmost position shown, as urged by a spring 63.

Behind the piston 58 we have provided another piston 62 that is constructed to have an internal valve cavity 64, an axial passage 66 and a radial passage 68, as well as an annular shank portion 70. The pistons 58 and 62 are separated by means of a spring 72 so as to prescribe a variable volume chamber 74 therebetween. In addition, the piston 58 is provided with a centrally recessed portion 76 to accommodate reciprocable motion of a valve poppet 78 carried by the piston 62 within the valve cavity and operatively connected thereto by means of a spring 80.

The spring 80 causes the valve poppet to seat its ball end 82 on a valve seat 84 press-fitted within an opening leading to the valve cavity 64 of the piston 62. As seen, the valve seat 84 is chamfered as at 86 to allow maximum flow through the seat when the valve is removed therefrom as by means of a hollow projection 88 operatively arranged to extend within the valve seat 84 and be slightly spaced from the ball end portion of the valve in the released position shown and from the inner walls of the valve seat 84 to thereby allow a return flow from the variable volume chamber 74 through the hollow projection and by various passages to the passage 54, and thence to the reservoir cavity 46.

The projection 88 is press-fitted within a structure 90 that is appropriately drilled to provide the passages aforementioned and slidably received within a collar 92 that at its forward end carries an annular disc 95. This disc performs the dual function of a reaction transmitting means and a seal for the structure 90. Furthermore, a C washer 94 held by a snap ring 96 holds the collar 92 and structure 90 within the tubular shank portion 70 of the piston 62. The structure 90 is slotted as at 98 to receive the C washer 94, which slot 98 is of a greater width than the washer to allow limited movement of the structure 90 without causing the piston 62 to be manually applied. Furthermore, in order to hold the projection 88 in the position shown in FIGURE 2, we have provided a spring 100 between the washer 94 and a rear flange 102 of the structure 90.

The brake pedal 14 is pivotally connected as at 104 (see FIGURE 1) to a control rod 106 which is held to the structure 90 by means of a spring connector 108 familiar to those skilled in the art to which our invention relates.

The power cavity 48 is provided with still another piston 110 which is biased by means of a spring 112 compressed between a shoulder 114 and the piston to the position shown in FIGURE 2. The piston 110 is arranged to abut along a surface 116 with the annular shank portion 70 of the piston 62 and upon an end cap 118 such that a variable volume chamber 120 is formed to the rear of the piston 110. The chamber 120 is connected by means of a passageway 122 within the housing 44 to the inlet port. As seen, the inlet port is provided with a first check valve adaptor 124 that includes a metallic plug reinforced valve element 126 biased by a spring 128 to close off the opening in the event of a power supply failure. As seen, the adaptor 124 is provided with openings 130 that communicate with the passageway 122 and immediately thereabove a further check valve body 132 is held in place with a similar metallic plug reinforced valve 134 being biased by a spring 136 to control an opening 138 similar to that of the valve 126.

We have also provided a stop 140 to limit the rearward movement of the piston 58 as well as a bleed 142 to port any trapped fluid between the seals 154 and 156 in the rear body of the piston 58.

Normally the fluid from pump 24 and accumulator 28 enters the port 32 and upon sufficient pressure opens the valve 126 to enter the passageway 122 to the variable volume chamber 120. This causes piston 110 to move down to compress the spring 112. This has an additional advantageous effect of lowering the brake pedal 14 in that as the piston 110 moves inwardly of the housing 44, control rod 106 is carried with it due to the spring connection 108. During this transition, the fluid within the variable volume chamber 74 passes through the axial passage 66 and the hollow plunger 88 through the drilled passages in the structure 90 to the passage 54 and thence to the reservoir cavity 46 to allow the inward movement of the brake pedal 14.

In operation, the operator of the vehicle depresses the brake pedal 14 which in turn moves the control rod 106 inwardly to first abut the plunger 88 on the ball 82 and thereafter lift the ball from the seat 84. Providing there is ample supply pressure from the pump and accumulator to the inlet port 32 when the ball 82 is lifted from the seat 84, the fluid passes by the check valves 126 and 134 to the radial passage 68, thence through the seat and about the annular disc 95 to the axial passage 66 into variable volume chamber 74. The fluid in the variable volume chamber is then directed to the discharge port 158 into conduit 34. The high pressure of the fluid within the variable volume chamber 74 plus the force of the spring 72 added thereto causes piston 58 to move downwardly to pressurize fluid in the variable volume chamber 160 and cause such fluid to be delivered to another discharge port 162 that is connected with conduit 36 to actuate the brakes as aforementioned.

In the event of a power failure, valve 126 will remain closed and the piston 110 will act as an accumulator piston so that upon the application of pressure to the brake pedal 14 to displace the valve 82 from seat 84, the variable volume chamber 120 will supply the valve chamber 64 through the valve 134 to provide a limited amount of pressure reserve. At the same time as this pressure reserve is being used up, the piston 110 moves rearwardly due to spring 112 to raise the brake pedal 14 to thereby provide an indication of a power failure to the operator as well as any increase travel he might need in applying the brakes manually.

When the pressure reserve within the variable volume chamber 120 is completely used up, the piston 62 and the piston 58 will be in the position shown in FIGURE 2 so that when the brake pedal is pushed inwardly, the structure picks up the C washer 94 to carry the piston 62 forwardly and pressurize the fluid in the chamber 74 which in turn, because of the spring connection 72 and pressure increase in chamber 74, causes transition of the piston 58 to pressurize fluid within the chamber 160 and thereby apply the brakes 20 and 22, respectively.

The foregoing is intended to illustrate but one form in which our invention may be found, and no doubt is expressed as to the possibility of other constructions which embody our contributions. Therefore, we maintain that the true scope of our invention is set forth by the appended claims.

We claim:
1. A power braking system comprising a first reservoir for a hydraulic fluid;
   a pump means for pressurizing the fluid of said reservoir, said pump means being in fluid communication with said reservoir;
   a combined master cylinder and power control valve adapted to receive the fluid from said pump, said master cylinder and power control valve including a piston means, a control valve operatively arranged in said piston means to control passage of fluid through passages within said combined master cylinder and power control valve and means operatively connected to said valve and said piston means to permit opening of said valve first and movement of said piston means thereafter when said valve has been fully opened and further force is applied to said means;
   a brake pedal operatively connected to said means operatively connected to said valve and said piston means; and
   a pressure responsive means operatively arranged between said brake pedal and said means operatively connected to said valve and said piston means within said combined master cylinder and power control valve, said pressure responsive means including cooperative check valve means in the flow passage between said pump and said combined master cylinder power control valve enabling said pressure responsive means to act as a pedal positioning device and as an accumulator having limited fluid capacity to provide fail-safe pressure boost in the event of an inadequate supply of pressurized fluid.

2. A vehicle braking system comprising:
   a hydraulic fluid pressure source including a pump and an accumulator;
   a combined master cylinder power control valve means including a housing having a reservoir cavity and an axial bore with means in said axial bore to divide said bore into first and second variable volume chambers including a first piston, a second piston operatively connected to said first piston ahead of same, a control valve operatively arranged in said first piston to control the passage of fluid through said piston from a radial passage to an axial passage therein, a fluid inlet means through said housing arranged to cooperate with said radial passage of said first piston and first and second outlets respectively arranged for said first and second variable volume chambers to permit pressurized flow to be exhausted from said combined master cylinder and power control valve;
   a pressure responsive member operatively connected to said first piston within said housing at the end opposite the operative connection between said first and second pistons which pressure responsive member is spring biased to a rearward position in said housing that is limited to prescribe a third variable volume chamber immediately therebehind with passage means within said housing connecting said third variable volume chamber to said inlet;
   a valve mechanism in said inlet within said housing including a first check valve arranged to control the flow from said pump into said inlet and allow said flow to enter said passage for said third variable volume chamber and a second check valve immediately thereabove to control flow from said first check valve and said passage into the housing and thence to the radial passage in said first piston means; and a first and second brake means operatively connected, respectively, to said first and second outlets from respective variable volume chambers which are actuated by pressure flow from said variable volume chambers to brake an associated vehicle.

3. In a braking system for a vehicle having a fluid pressurizing system, a combined master cylinder and power control valve comprising:

a housing having a bore therein with a fluid inlet port, a pressure delivery port and a reservoir port;

a first piston operatively arranged in said bore to be biased by a spring to the rear of said bore;

a second piston operatively mounted in said bore in front of said first piston which second piston is operatively connected to said first piston;

a control valve operatively connected to said second piston to control passage of fluid through passages in said second piston and out to said fluid pressure delivery port; and check valve means operatively arranged in said inlet to isolate the fluid pressurizing system from the combined master cylinder and power control valve as well as isolating a variable volume chamber behind said first piston from the control valve.

No references cited.

MARTIN P. SCHWADRON, *Primary Examiner.*

R. R. BUNEVICH, *Assistant Examiner.*